US009983827B1

(12) United States Patent
Tsirkin et al.

(10) Patent No.: US 9,983,827 B1
(45) Date of Patent: May 29, 2018

(54) KEY-BASED MEMORY DEDUPLICATION PROTECTION

(71) Applicant: Red Hat Israel, Ltd., Ra'anana (IL)

(72) Inventors: Michael Tsirkin, Westford, MA (US); Uri Lublin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days. days.

(21) Appl. No.: 15/363,817

(22) Filed: Nov. 29, 2016

(51) Int. Cl.
*G06F 12/00* (2006.01)
*G06F 3/06* (2006.01)

(52) U.S. Cl.
CPC .......... *G06F 3/0652* (2013.01); *G06F 3/0608* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 8,997,179 B2 | 3/2015 | Kruglick | |
| 9,086,819 B2 | 7/2015 | Panchbudhe et al. | |
| 9,323,677 B2 | 4/2016 | Dube et al. | |
| 9,342,465 B1 | 5/2016 | Meiri | |
| 9,405,708 B1 | 8/2016 | Pohlack | |
| 9,639,577 B1* | 5/2017 | Lai .................... | G06F 17/30477 |
| 2014/0297603 A1* | 10/2014 | Kim .................. | G06F 17/30159 |
| | | | 707/692 |
| 2015/0205716 A1 | 7/2015 | Moon et al. | |

FOREIGN PATENT DOCUMENTS

WO   WO2015/108931   7/2015

OTHER PUBLICATIONS

Anudeep Para, Mahesh N, Self Assured Deduplication System for Authorized Deduplication, Jan.-Feb. 2016, Student of M.Tech (CSE); Asst. Prof, Department of Computer Science and Engineering, QIS Institute of technology, Ongole, http://www.iosrjournals.org/iosr-jce/papers/Vol18-issue1/Version-3/L018137479.pdf.
*EMC Data Domain Encryption—A Detailed Review*, 2015, https://www.emc.com/collateral/white-papers/h11561-data-domain-encryption-wp.pdf.
Pasquale Puzio, Refik Molva, Melek Onen, Sergio Loureiro, *ClouDedup: Secure Deduplication with Encrypted Data for Cloud Storage*, SecludIT and EURECOM Sophia-Antipolis, France, http://www.eurecom.fr/en/publication/4136/download/rs-publi-4136.pdf.

* cited by examiner

*Primary Examiner* — Daniel D Tsui
(74) *Attorney, Agent, or Firm* — Haynes and Boone, LLP (57) ABSTRACT

Methods, systems, and computer program products are included for deduplicating one or more memory pages. A method includes receiving a first key from a first application running on a computer system. The method also includes associating the first key with a first memory allocated to the first application and scanning a second memory for duplicate memory pages of the first memory. The second memory is associated with a second key and allocated to a second application running on the computer system. The method also includes in response to a determination that the first and second keys are the same and that a scanned memory page is a duplicate of a first memory page of the first memory, deduplicating the scanned memory page and the first memory page.

20 Claims, 6 Drawing Sheets

KEY-BASED MEMORY DEDUPLICATION PROTECTION

FIELD OF DISCLOSURE

The present disclosure generally relates to electrical computers and digital data processing, and more particularly to memory management.

BACKGROUND

Memory deduplication improves memory utilization by detecting that two (or more) pages in memory are identical and merging the duplicate pair of pages into a single page. In an example, a first memory page may reside in a first application's memory space, and a second memory page may reside in a second application's memory space. If the first and second memory pages have the same content, the first memory page may be considered a duplicate of the second memory page and removed. In such an example, the page table of the first application may be modified to point to the second memory page, and the first application may use the second memory page rather than the first memory page, thus improving the utilization of memory.

BRIEF SUMMARY

Methods, system, and techniques for deduplicating one or more memory pages are provided.

An example method of deduplicating one or more memory pages includes receiving, by an operating system, a first key from a first application running on a computer system. The method also includes associating, by the operating system, the first key with a first memory allocated to the first application. The method further includes scanning a second memory for duplicate memory pages of the first memory, the second memory associated with a second key and allocated to a second application running on the computer system. The method also includes in response to a determination that the first and second keys are the same and that a scanned memory page is a duplicate of a first memory page of the first memory, deduplicating the scanned memory page and the first memory page.

An example system for deduplicating one or more memory pages includes a memory that stores a key associated with a first set of memory pages allocated to a first application running on a computer system. The system also includes an association module that associates the key with the first set of memory pages. The system further includes a deduplication module that scans a second set of memory pages for duplicates of the first set of memory pages. The second set of memory pages is allocated to a second application running on the computer system. In response to a determination that a scanned memory page is associated with the key and is a duplicate of a first memory page of the first set of memory pages, the deduplication module deduplicates the scanned memory page and the first memory page.

An example machine-readable medium includes a plurality of machine-readable instructions that when executed by one or more processors is adapted to cause the one or more processors to perform a method including: receiving, by an operating system, a first key from a first application running on a computer system; associating, by the operating system, the first key with a first memory allocated to the first application; scanning a second memory for duplicate memory pages of the first memory, the second memory associated with a second key and allocated to a second application running on the computer system; and in response to a determination that the first and second keys are the same and that a scanned memory page is a duplicate of a first memory page of the first memory, deduplicating the scanned memory page and the first memory page.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would render an example non-functional.

An operating system executing on a machine may process memory pages, insert them into a data structure, and identify memory pages in the data structure that are identical. Two memory pages are identical if the content stored at those pages is the same. If two memory pages are identified as being identical, the operating system may identify the applications that use those particular memory pages and map the two applications to reference one of those identical memory pages and discard the other memory page. Both the first application's page table and the second application's page table may store a mapping to the same memory page, which may be referred to as a deduplicated memory page. If the first application attempts to modify the deduplicated memory page, the operating system provides the first application with a copy of the deduplicated memory page and updates the mapping in the first application's page table to reference the copy of the deduplicated memory page (rather than to the original deduplicated memory page). The first application may then be allowed to write to the copy of the deduplicated memory page.

Memory deduplication improves memory utilization by detecting that two (or more) pages in memory have identical content. Memory deduplication analyzes patterns of information by segmenting a dataset into, for example, variable-length blocks and searching for recurring blocks. All identical successive blocks are replaced with a pointer to the respective initial detected block instead of storing the block again. When reading the file, the pointer series ensures that all the blocks are accessed in the exact order.

With memory deduplication, however, a problem may arise in the leakage of an application's accessed content information. For example, a first application may attempt to access a memory page that is referenced by both the first application and a second application running on the same computer system. If the first application attempts to write to the deduplicated memory page and it takes a while for the write to complete, the first application or user of the first application may speculate that another application points to the same memory page, and the memory page was deduplicated and copied on the write. In particular, based on the difference in timing for performance of the write to the memory page, the first application or user of the first application may determine that another application was using the same memory page and it was deduplicated. For example, a user may point an application (e.g., Web browser) to a particular webpage, and due to the time it takes to perform an action on the webpage, the user may guess that another application running on the same computer system has visited that particular page. This is problematic because information may be leaked from one application to another application.

A solution that may overcome this problem of information leakage may include associating related applications with the use of a common key. Before two identical memory pages are deduplicated, the operating system may first check whether they are associated with the same key. If so, the operating system may deduplicate the memory pages. If not, the operating system may determine to not deduplicate the memory pages (even though they are identical). Even though related applications may detect that they are sharing and accessing the same content, this may not cause a security concern. It may be more difficult, however, for unrelated applications to do so. Accordingly, memory deduplication protection for one or more memory pages to prevent information from being leaked between unrelated applications may be provided. Additionally, as further explained in the present disclosure, the key may be used as a condition for scanning memory pages to detect duplicates, thereby providing improved speeds. More specifically, use of the key may allow the application to scan fewer memory pages for deduplication purposes.

Described herein are methods and systems for deduplicating one or more memory pages. In some examples, an example method of deduplicating one or more memory pages includes receiving, by an operating system, a first key from a first application running on a computer system. The method also includes associating, by the operating system, the first key with a first memory allocated to the first application and scanning a second memory for duplicate memory pages of the first memory. The second memory is associated with a second key and allocated to a second application running on the computer system. The method further includes in response to a determination that the first and second keys are the same and that a scanned memory page is a duplicate of a first memory page of the first memory, deduplicating the scanned memory page and the first memory page.

These techniques are beneficial and advantageous for reducing the leakage of information between unrelated applications, while at the same time improving memory usage. Of course, it is understood that these features and advantages are shared among the various examples herein and that no one feature or advantage is required for any particular example.

Unless specifically stated otherwise, as apparent from the following discussion, it is appreciated that throughout the description, discussions utilizing terms such as "determining," "associating," "sending," "receiving," "detecting," "scanning," "deduplicating," "storing," "identifying," "searching," "concatenating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
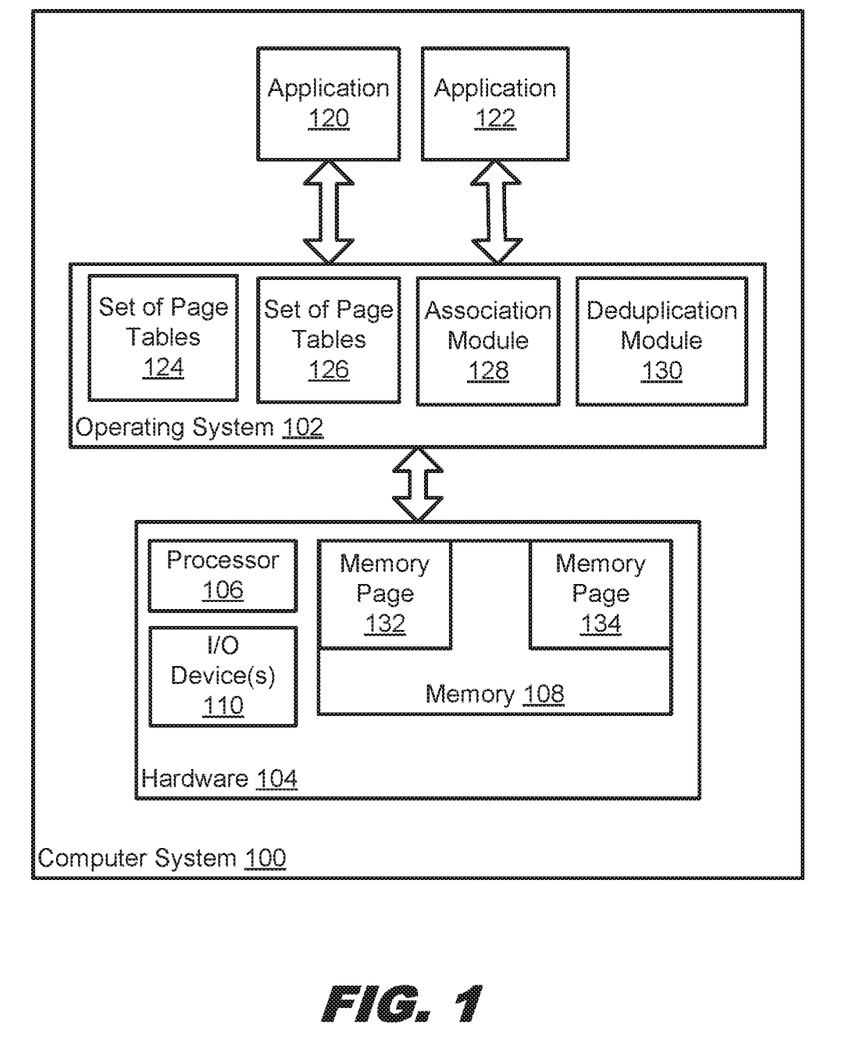
FIG. 1 depicts a computer system for deduplicating one or more memory pages in accordance with one or more aspects of the present disclosure.

FIG. 1 depicts a computer system 100 for deduplicating one or more memory pages in accordance with one or more aspects of the present disclosure. Computer system 100 includes an operating system 102 coupled to hardware 104. Hardware 104 includes a processor 106 and a memory 108, and may include other input/output (I/O) devices 110. An application 120 and an application 122 may run in computer system 100. Each of the applications may be allocated an address space corresponding to memory 108.

"Memory" herein shall refer to volatile or non-volatile memory, such as random access memory (RAM), read-only memory (ROM), electrically erasable ROM (EEPROM), or any other memory capable of storing data. A "processor" may also be referred to as a "physical processor" or "CPU" herein. A processor shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single-core processor that is typically capable of executing one instruction at a time (or process a single pipeline of instructions), or a multi-core processor that may simultaneously execute multiple instructions at a time. In another aspect, a processor may be implemented as a single integrated circuit, two or more integrated circuits, or may be a component of a multi-chip module (e.g., in which individual microprocessor dies are included in a single integrated circuit package and hence share a single socket).

Computer system 100 may be coupled over a network (not shown). The network may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and HTTP, and various combinations of the foregoing.

Operating system 102 may allocate memory to an application running on computer system 100. The application may access memory 108 for reads, writes, and/or execution of instructions. In an example, operating system 102 maintains a set of pages tables 124 for application 120 and a set of page tables 126 for application 122. Page tables are used to establish an association between the virtual address spaces of user processes and the physical memory of the system (RAM, page frames). Each stored entry of a page table is called a page table entry. Although two applications are illustrated as running on computer system 100, it should be understood that more than two applications may run on computer system 100 and each of these applications may have their own sets of pages tables.

Operating system 102 serves as an intermediary layer between hardware 104 and the software (e.g., applications running on computer system 100). In an example, the operating system is a LINUX® operating system. Trademarks are the property of their respective owners. The operating system manages resources of computer system 100 when one or more applications are running on computer system 100. In an example, the operating system may share available resources (e.g., CPU time, disk space, and network connections) between various system processes while at the same time ensuring system integrity. The operating system may use a memory management technique called virtual memory, which maps virtual addresses used by an application into physical addresses in memory 108. In a virtual memory system, the addresses seen by user programs do not directly correspond to the physical addresses used by the hardware. Processor 106 may include a memory management unit (MMU) (not shown) that supports the use of virtual memory. With the MMU, memory addresses may go through a translation step from a virtual address to a physical address prior to each memory access. Memory 108 may include random access memory (RAM), and a MMU may divide the RAM into pages. A page is a contiguous section of memory of a set size that is handled by the MMU. In an example, each page is four kilobytes (KB).

In an example, each entry in a page table maps a location in an application's virtual memory space to a location in the physical memory space. In an example, address translation transforms addresses in the application's virtual address space to locations in physical memory (e.g., memory 108). The page table entry for a virtual page has permission bits that specify what a user space process can and cannot do with the particular page. The permission bits may specify whether a user space process may perform read, write, and/or execute (execution permission indicates that page binary data may be executed as machine code in the same way as programs are executed) operations on the page. In an example, processor 106 may use set of page tables 124 to translate virtual memory addresses allocated to application 120 to physical memory addresses, and to ensure that an entity has permission to perform a particular action on a memory page.

Operating system 128 may allocate memory for applications running on computer system 100. Operating system 102 includes an association module 128 and a deduplication module 130. Association module 128 obtains a key from an application and associates the key with memory allocated to the application. In an example, the application generates the key. In another example, operating system 102 generates the key and provides it to the application. In some examples, the key is a text string. The key may be a universally unique identifier (UUID).

Deduplication module 130 may compare the memory pages allocated to application 120 and application 122 to identify duplicates. In an example, deduplication module 130 maintains one or more memory pages in memory 108 in a tree structure and detects when two or more memory pages in the tree are identical. Each of these identical memory pages may be referenced in a page table entry of the application that uses the respective memory page. For example, if application 120 stores data in a memory page 132, application 120's set of page tables 124 may include a page table entry that stores a mapping to memory page 132. Similarly, if application 122 stores data in memory page 134, application 122's set of page tables 126 may include a page table entry that stores a mapping to memory page 134.

Deduplication module 130 deduplicates identical memory pages if they are associated with the same key. The key may be stored in a file. Deduplication module 130 may deduplicate the identical memory pages by updating one of these mappings to reference as read-only (i.e., with write protection) one of these memory pages and free the other memory page. In response to detecting an attempted write to the remaining identical memory page, deduplication module 130 may create a copy of the memory page and update the mapping in the writing application's page table entry to reference the copy of the memory page rather than the initial identical memory page. Although memory deduplication has its advantages, it may also be desirable to protect particular memory pages from being deduplicated in order to reduce the leakage of information from one application to another application. By deduplicating identical memory pages only if they are associated with the same key and thus shared by related applications, deduplication module 130 may avoid an application from determining that other unrelated applications also access this memory content.

Figure 2:
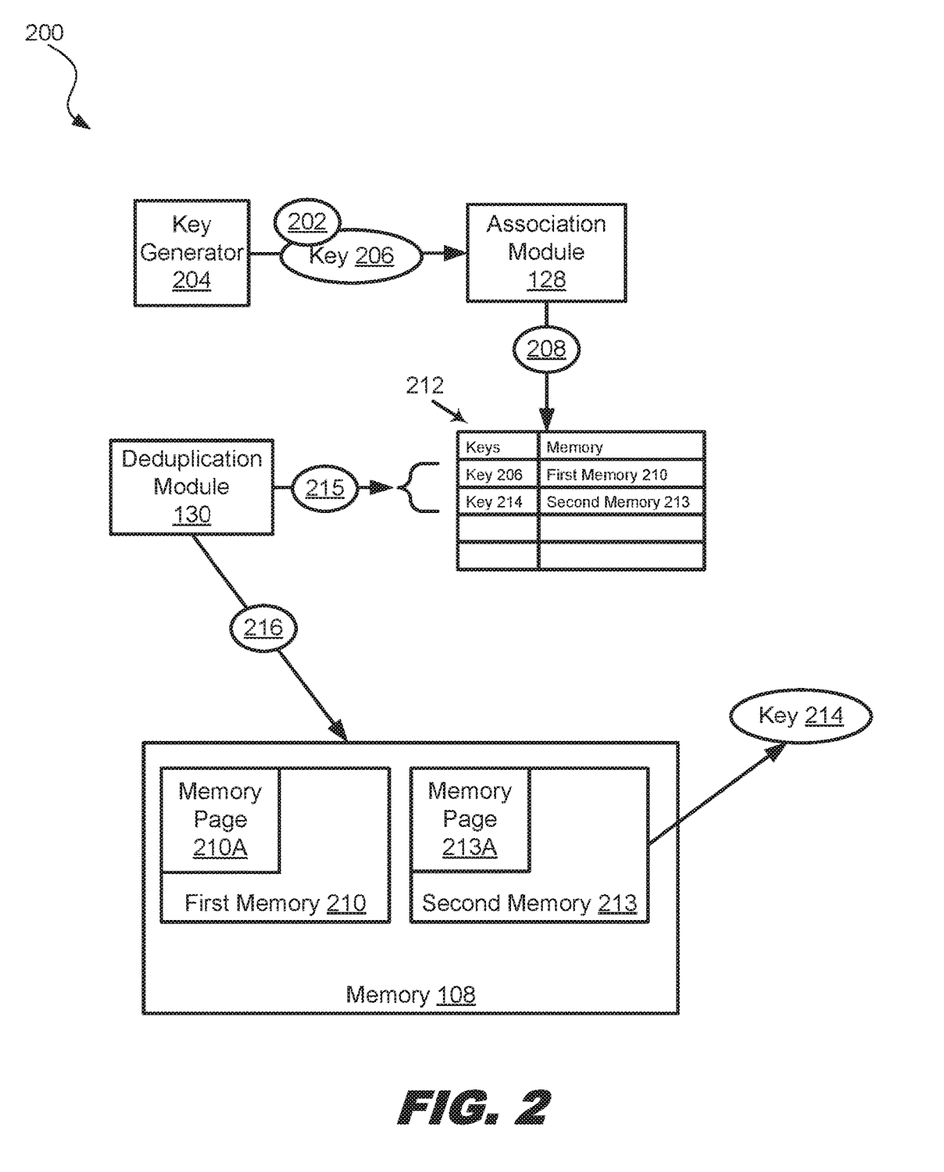
FIG. 2 illustrates a process flow for deduplicating one or more memory pages in accordance with one or more aspects of the present disclosure.

FIG. 2 illustrates a process flow 200 for deduplicating one or more memory pages in accordance with one or more aspects of the present disclosure. At action 202, a key generator 204 generates a key 206 and sends it to association module 128. Key generator 204 may be incorporated into association module 128 or application 120, or be a stand-alone function that generates one or more keys. In an example, application 120 generates key 206 and stores it in memory 108. Application 120 may share this key with a related application (e.g., application 122). In this example, application 120 may store the key in a file that is shared with applications related to application 120. In another example, operating system 102 generates a random number and sends this to application 120 as key 206. Application 120 may receive key 206 from operating system 102.

Association module 128 obtains key 206 from key generator 204. At action 208, association module 128 associates key 206 with a first memory 210 allocated to application 120. Operating system 102 allocated first memory 210 to application 120 and may include one or more ranges of memory allocated to application 120. First memory 210 may include all of or a portion of memory allocated to application 120. Association module 128 may maintain a key-memory mapping table 212 that stores one or more mappings. Key-memory mapping table 212 includes a set of entries, and each entry maps a key to one or more memory regions allocated to an application. In some examples, a memory associated with a key includes one or more memory ranges allocated to an application. If a key and a memory page are stored in the same entry, they are associated with each other.

Key generator 204 may generate a key per-application or per-user, for example. In an example, an application is a browser application that the user uses to retrieve Web content. If the user launches different instances of the browser application, respective instances of the Web browser may retrieve key 206 and associate this key with memory allocated to the respective instance. Accordingly, each instance of the browser application may share the same key 206 stored in memory 108. In an example, a single key may be shared between related applications, rather than copies of the key. Each user may have an application user profile account, and each application user profile account may be associated with the same key. An application may store key 206 as part of a user's profile. Application user profiles of the same user may be associated with a common key. In an example, if the user installs an application such as a Web browser and uses it to access Web content, the Web browser may generate a key and store it as part of the user's profile. Applications may be associated with a common application user profile, and application 120 may store key 206 into a file associated with the common application user profile.

Memory 108 includes first memory 210 and a second memory 213. Operating system 102 allocated second memory 213 to application 122 and may include one or more ranges of memory allocated to application 122. First memory 210 includes memory pages located in an address space allocated to application 120, and the address space may be a virtual address space. Second memory 213 includes memory pages located in an address space allocated to application 122, and the address space may be a virtual address space. In an example, first memory 210 includes a set of memory pages that is used by application 120, and second memory 213 includes a set of memory pages that is used by application 122. Additionally, second memory 213 is associated with a key 214 that may or may not be the same as key 206. At action 215, deduplication module 130 determines whether key 206 is the same as key 214. In an example, if key 206 is the same as key 214, only one key is stored and is a shared secret between application 120 and application 122. If keys 206 and 214 are not the same key, deduplication module 130 determines to not compare and deduplicate memory pages of first memory 210 and second memory 213. Accordingly, deduplication module 130 may "skip" second memory 213 and scan other memory pages to determine whether to deduplicate, for example, a third memory allocated to another application running on computer system 100. In an example, deduplication module 130 determines whether keys 206 and 214 are the same before scanning first memory 210 and second memory 213 for duplicates. If keys 206 and 214 are the same, deduplication module 130 may scan first memory 210 and second memory 213 for duplicates. If they are not the same, deduplication module 130 may determine to not scan first memory 210 and second memory 213 for duplicates.

If keys 206 and 214 are the same, at action 216, deduplication module 130 determines to deduplicate identical memory pages of first memory 210 and second memory 213. If keys 206 and 214 are the same, application 120 and application 122 are related and share a common key. In an example, application 120 and application 122 are related if they are instances of a common application. In another example, application 120 and application 122 are related if they are associated with a common user. For example, application 122 is not associated with key 206, which is associated with application 120, if application 120 and application 122 are not associated with a common user.

In some examples, deduplication module 130 scans second memory 213 for duplicate memory pages of first memory 210. Deduplication module 130 may scan the entirety of second memory 213 to search for duplicate memory pages of first memory 210. In an example, for each scanned memory page of second memory 213, deduplication module 130 determines whether the respective scanned memory page is identical to at least one in first memory 210. Memory pages are identical if they store the same content. If memory pages are not identical memory pages, then deduplication module 130 does not deduplicate them. If memory pages are identical and are also associated with the same key, then deduplication module 130 may deduplicate them.

Application 120's set of page tables 124 may include a mapping that references a memory page 210A of first memory 210, and application 122's set of page tables 126 may include a mapping that references a memory page 213A. Deduplication module 130 may update the mapping in set of page tables 126 to reference memory page 210A rather than memory page 213A, and thus free memory page 213A so that it may be used to store other data. Accordingly, both application 120's set of page tables 124 and application 122's set of page tables 126 may store a mapping that references the memory page 210A.

Figure 3:
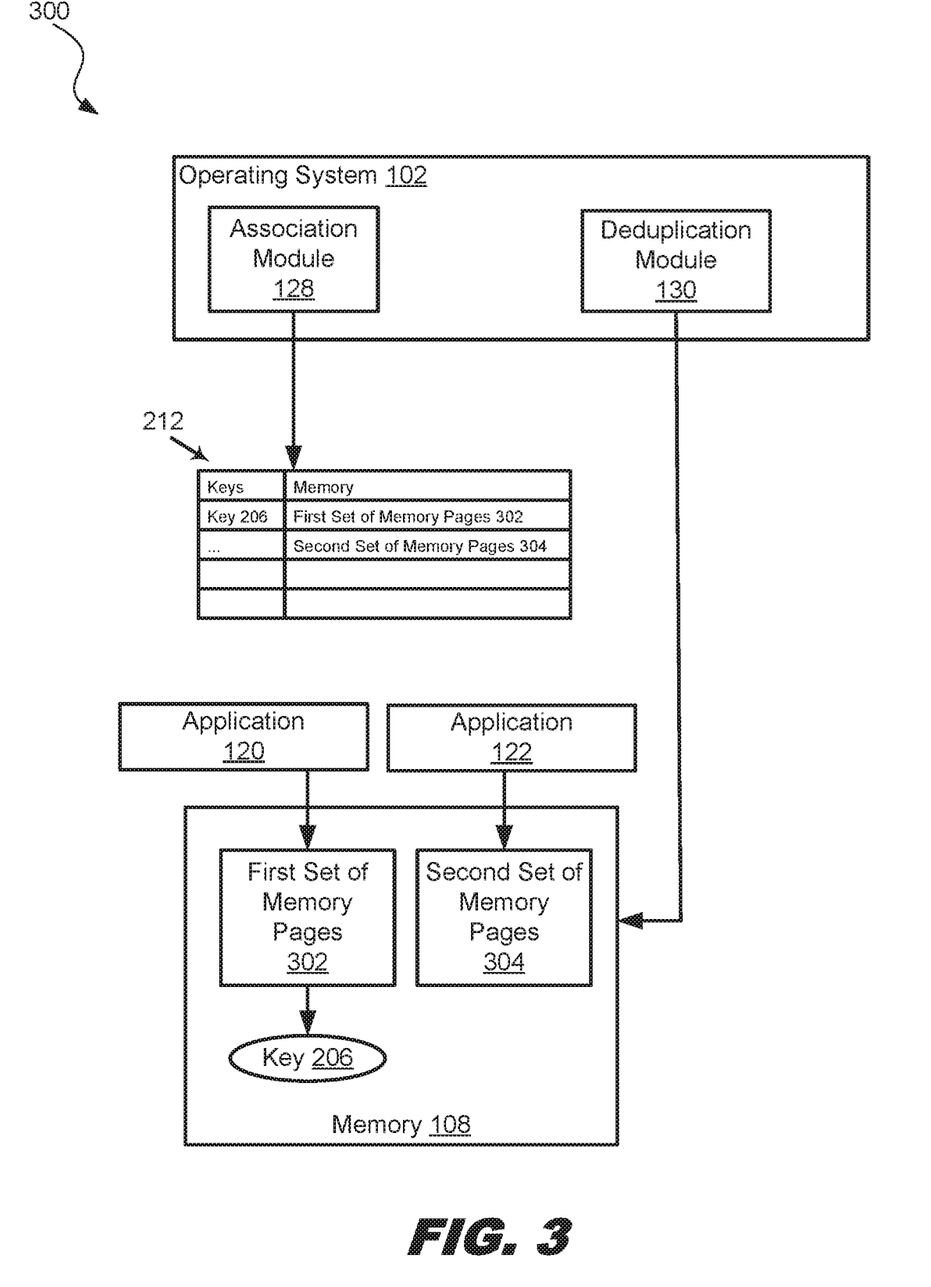
FIG. 3 illustrates a block diagram for deduplicating one or more memory pages in accordance with one or more aspects of the present disclosure.

FIG. 3 illustrates a block diagram 300 for deduplicating one or more memory pages in accordance with one or more aspects of the present disclosure. In the example illustrated in FIG. 3, memory 108 stores key 206 associated with a first set of memory pages 302 allocated to application 120 running on computing device 102. Association module 128 may obtain key 206 and associate it with first set of memory pages 302.

Deduplication module 130 scans a second set of memory pages 304 allocated to application 122. Deduplication module 130 scans second set of memory pages 304 for duplicates of first set of memory pages 302. If first set of memory pages 302 and second set of memory pages 304 are both associated with key 206, deduplication module 130 may scan second set of memory pages 304 by identifying a data structure associated with key 206, where the data structure stores memory pages of second set of memory pages 304 (or second memory 213). Deduplication module 130 may then search the data structure for memory pages that are duplicates of first set of memory pages 302.

In response to a determination that a scanned memory page of second set of memory pages 304 is associated with key 206 and is a duplicate of a memory page of first set of memory pages 302, deduplication module 130 deduplicates these memory pages. In contrast, in response to a determination that the scanned memory page is associated with a key different from key 206, deduplication module 130 determines to not deduplicate the scanned memory page (even if the scanned memory page is a duplicate of a memory page of first set of memory pages 302).

Figure 4:
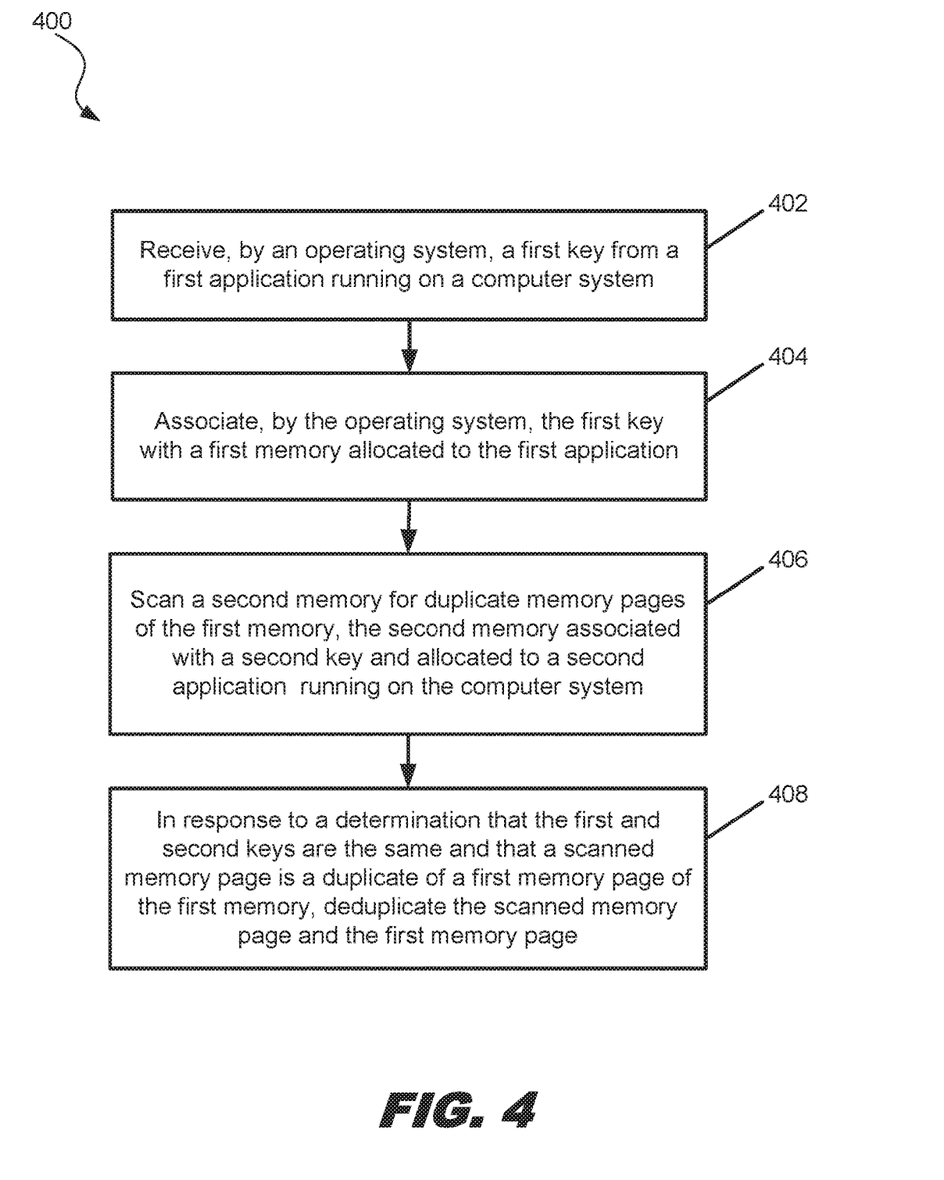
FIG. 4 illustrates a process flow for deduplicating one or more memory pages in accordance with one or more aspects of the present disclosure.

FIG. 4 illustrates a process flow 400 for deduplicating one or more memory pages in accordance with one or more aspects of the present disclosure. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 400 is performed by computer system 100 illustrated in FIG. 1. For example, blocks of method 400 may be performed on computer system 100, which may be a client or server computer. In some examples, the order of the actions described below may also be performed according to alternative orderings. In yet other examples, additional actions may be added and actions that are described may be removed.

In FIG. 4, in block 402, operating system 102 receives a first key 206 from application 120 running on computer system 100. In block 404, operating system 102 associates first key 206 with first memory 210 allocated to application 120. First memory 210 may include one or more memory address ranges allocated to application 120. In block 406, operating system 102 scans a second memory 213 for duplicate memory pages of first memory 210, the second memory 210 associated with a second key 214 and allocated to an application 122 running on computer system 100. In block 408, in response to a determination that the first key 206 and second key 214 are the same and that a scanned memory page is a duplicate of a first memory page of first memory 210, deduplication module 130 deduplicates the scanned memory page and the first memory page. In an example, deduplication module 130 concatenates key 206 and first set of memory pages 302 stored at first memory 210 and concatenates key 214 and second set of memory pages 304 stored at second memory 213. The first set of memory pages 302 may include one or more memory pages, and the second set of memory pages 304 may include one or more memory pages. In an example, a key may be concatenated to each of the memory pages that is compared. Deduplication module 130 may scan second memory 213 by determining whether the concatenated first key and first set of memory pages is the same as the concatenated second key and second set of memory pages. If the concatenated first key and first set of memory pages is the same as the concatenated second key and second set of memory pages, keys 206 and 214 are the same and second set of memory pages 213 is a duplicate of first set of memory pages 210.

Figure 5:
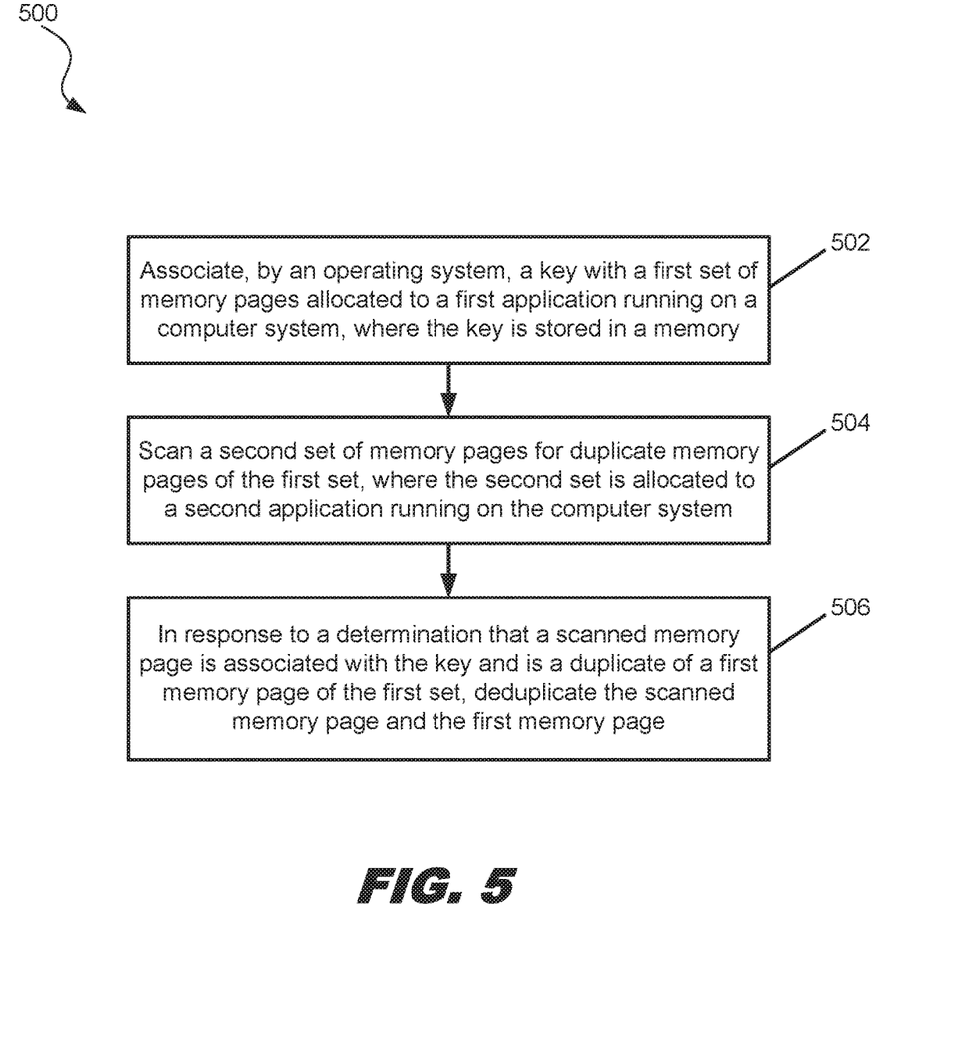
FIG. 5 illustrates a process flow for deduplicating one or more memory pages in accordance with one or more aspects of the present disclosure.

FIG. 5 illustrates a process flow 500 for deduplicating one or more memory pages in accordance with one or more aspects of the present disclosure. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 500 is performed by computer system 100 illustrated in FIG. 1. For example, blocks of method 500 may be performed on computer system 100, which may be a client or server computer. In some examples, the order of the actions described below may also be performed according to alternative orderings. In yet other examples, additional actions may be added and actions that are described may be removed.

In FIG. 5, in block 502, operating system 102 associates a key 206 with first set of memory pages 302 allocated to application 120 running on computer system 100, where the key 206 is stored in memory 108. In block 504, operating system 102 scans a second set of memory pages 304 for duplicate memory pages of the first set of memory pages 302, where the second set of memory pages 304 is allocated to an application 122 running on computer system 100. In block 506, in response to a determination that a scanned memory page is associated with the key 206 and is a duplicate of a first memory page of the first set of memory pages 302, operating system 102 deduplicates the scanned memory page and the first memory page.

Figure 6:
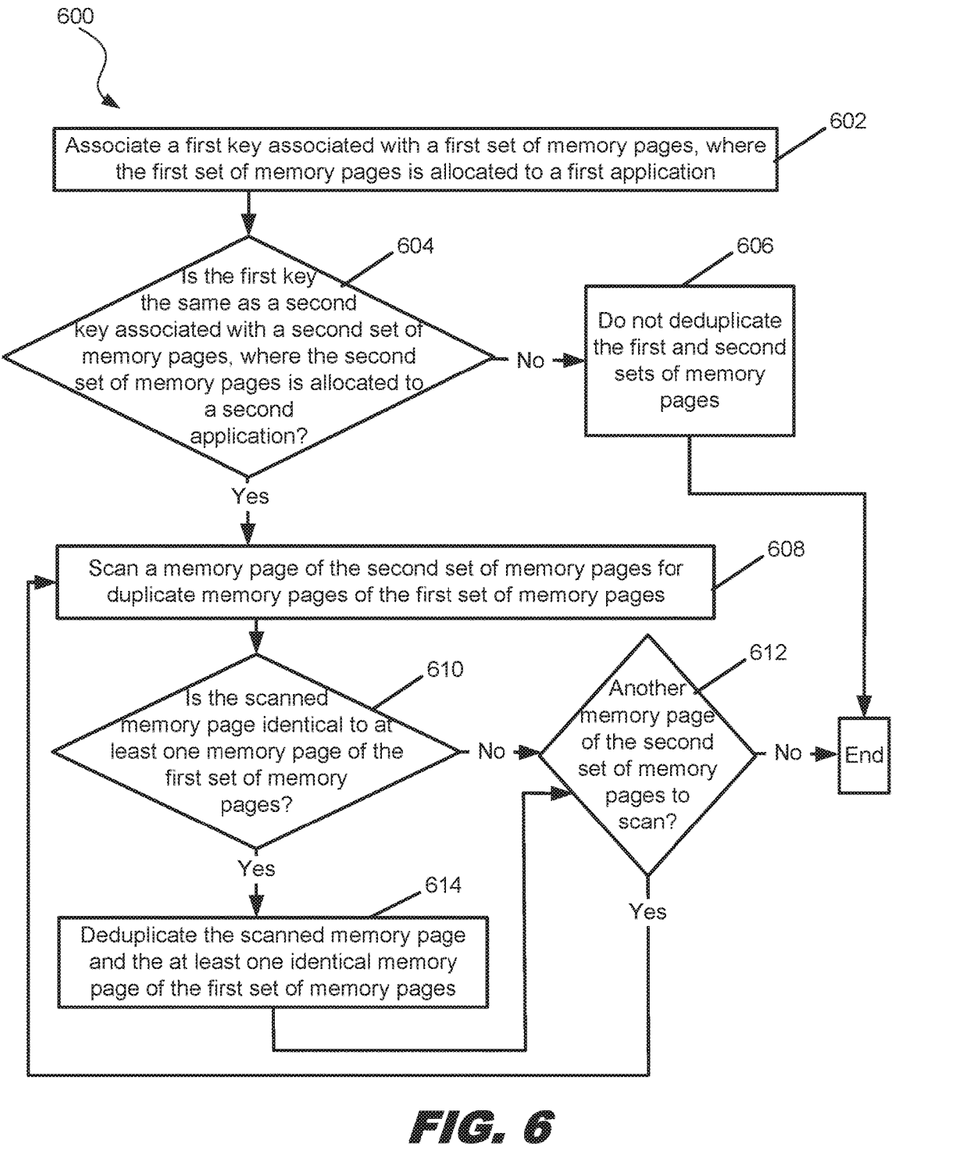
FIG. 6 illustrates a process flow for deduplicating one or more memory pages in accordance with one or more aspects of the present disclosure.

FIG. 6 illustrates a process flow 600 for deduplicating one or more memory pages in accordance with one or more aspects of the present disclosure. Method 600 is not meant to be limiting and may be used in other applications. Method 600 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 600 is performed by computer system 100 illustrated in FIG. 1. For example, blocks of method 600 may be performed on computer system 100, which may be a client or server computer. In some examples, the order of the actions described below may also be performed according to alternative orderings. In yet other examples, additional actions may be added and actions that are described may be removed.

In FIG. 6, in block 602, operating system 102 associates a first key 206 associated with first set of memory pages 302, where the first set of memory pages 302 is allocated to an application 120. In block 604, operating system 102 determines whether the first key 206 is the same as second key 214 associated with second set of memory pages 304, where the second set of memory pages 304 is allocated to application 122. If operating system 102 determines that the first key 206 is not the same as second key 214 associated with second set of memory pages 304, process flow proceeds from block 604 to block 606, in which operating system 102 does not deduplicate the first set of memory pages 210 and second set of memory pages 213. If operating system 102 determines that the first key 206 is the same as the second key 214, process flow proceeds from block 604 to block 608, in which operating system 102 scans a memory page of second set of memory pages 304 for duplicate memory pages of first set of memory pages 302.

In block 610, operating system 102 determines whether the scanned memory page is identical to at least one memory page of first set of memory pages 302. If operating system 102 determines that the scanned memory page is not identical to at least one memory page of first set of memory pages 302, process flow proceeds from block 610 to block 612, in which operating system 102 determines whether another memory page of second set of memory pages 304 is to be scanned. If no memory page of second set of memory pages 304 is left to be scanned, process flow 600 may end. In contrast, if operating system 102 determines that the scanned memory page is identical to at least one memory page of first set of memory pages 302, process flow proceeds from block 610 to block 614, in which operating system 102 deduplicates the scanned memory page and the at least one identical memory page of first set of memory pages 302. Process flow proceeds from block 614 to block 612. In block 612, if operating system 102 determines that another memory page of second set of memory pages 304 is to be scanned, process flow proceeds to block 608. If no memory page of second set of memory pages 304 is left to be scanned, process flow 600 may end.

As discussed above and further emphasized here, FIGS. 1-6 are merely examples, which should not unduly limit the scope of the claims. For example, it should be understood that one or more modules (e.g., association module 128 and deduplication module 130) in FIG. 1 may be combined with another module. In an example, association module 128 and deduplication module 130 may be combined into one module. It should also be understood that one or more modules in FIG. 1 may be separated into more than one module.

A computer system is suitable for implementing one or more examples of the present disclosure. In various implementations, computer system 100 may include a client or a server computing device. The client or server computing device may include a plurality of processors 106. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

The example computer system may include a bus or other communication mechanism for communicating information data, signals, and information between various components of the computer system. Additionally, the computer system includes an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (e.g., a keyboard, keypad, mouse, etc.).

A transceiver or network interface transmits and receives signals between the computer system and other devices via a communications link to a network. In an example, the transmission is wireless, although other transmission mediums and methods may also be suitable. Processor 106, which may be a micro-controller, digital signal processor (DSP), or other processing component, processes these various signals, such as for display on the computer system or transmission to other devices via a communications link. Processor 106 may also control transmission of information, such as cookies or IP addresses, to other devices.

Components of the computer system also include a system memory component (e.g., RAM), a static storage component (e.g., ROM), and/or a computer readable medium (e.g., disk drive). The system memory component may include memory 108. The computer system performs specific operations by processor 106 and other components by executing one or more sequences of instructions contained in the system memory component. Logic may be encoded in a computer readable medium, which may refer to any medium that participates in providing instructions to processor 106 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., process flow 200, process flow 400, process flow 500, and/or process flow 600) to practice the present disclosure may be performed by the computer system. In various other examples, a plurality of the computer systems coupled by a communication links to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps, blocks, or actions described herein may be changed, combined into composite steps, blocks, or composite actions, and/or separated into sub-steps, sub-blocks, or sub-actions to provide features described herein.

In the foregoing description, numerous details are set forth. It will be apparent, however, to one of ordinary skill in the art having the benefit of this disclosure, that the present disclosure may be practiced without these specific details. In some examples, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the disclosure should be limited only by the following claims, and it is appropriate that the claims be construed broadly and in a manner consistent with the scope of the examples disclosed herein.

What is claimed is:

1. A method of deduplicating one or more memory pages, comprising:
    receiving, by an operating system, a first key from a first application running on a computer system;
    associating, by the operating system, the first key with a first memory allocated to the first application;
    scanning a second memory for duplicate memory pages of the first memory, the second memory associated with a second key and allocated to a second application running on the computer system, wherein the scanning includes scanning a second memory page of the second memory; and
    in response to a determination that the first and second keys are the same and that the scanned second memory page is a duplicate of a first memory page of the first memory, deduplicating the scanned second memory page and the first memory page.

2. The method of claim 1, further comprising:
determining whether the first and second keys are the same;
in response to a determination that the first and second keys are the same, determining whether each scanned memory page is a duplicate of at least one memory page of the first memory; and
in response to a determination that the first and second keys are not the same, determining to not deduplicate the scanned second memory page and the first memory page.

3. The method of claim 2, wherein scanning the second memory includes in response to a determination that the first and second keys are the same, scanning the second memory.

4. The method of claim 1, wherein the first and second keys are the same, and the scanning further includes:
identifying, by the operating system, a data structure associated with the first key, the data structure storing memory pages of the second memory; and
searching, by the operating system, the data structure for memory pages that are duplicates of the first memory.

5. The method of claim 1, further comprising:
concatenating the first key and a first set of memory pages stored at the first memory; and
concatenating the second key and a second set of memory pages stored at the second memory, wherein scanning the second memory includes determining whether the concatenated first key and first set of memory pages is the same as the concatenated second key and second set of memory pages, and
wherein if the concatenated first key and first set of memory pages is the same as the concatenated second key and second set of memory pages, the first and second keys are the same and the second set of memory pages is a duplicate of the first set of memory pages.

6. The method of claim 1, wherein the first application generates the key and shares the key with the second application.

7. The method of claim 1, wherein the first memory includes one or more ranges of memory allocated to the first application.

8. A system for deduplicating one or more memory pages, comprising:
a memory that stores a key associated with a first set of memory pages allocated to a first application running on a computer system;
an association module that associates the key with the first set of memory pages, wherein a second set of memory pages is allocated to a second application running on the computer system; and
a deduplication module that determines whether the second set of memory pages is associated with the key, wherein in response to a determination that the second set of memory pages is associated with the key, the deduplication module scans one or more pages of the second set of memory pages for duplicate memory pages of the first set, and
wherein in response to a determination that a scanned memory page of the second set of memory pages is a duplicate of a first memory page of the first set, the deduplication module deduplicates the scanned memory page and the first memory page.

9. The system of claim 8, wherein in response to the determination that the second set of memory pages is associated with the key, the deduplication module determines whether the scanned memory page is a duplicate of at least one memory page of the first set.

10. The system of claim 9, wherein if the second set of memory pages is associated with a second key different from the first key, the deduplication module does not deduplicate the scanned memory page.

11. The system of claim 8, wherein the key is stored in a file.

12. The system of claim 8, wherein the second application is associated with the key if the first and second applications are instances of a common application.

13. The system of claim 8, wherein the first application generates the key and shares the key with the second application.

14. The system of claim 13, wherein the first and second applications are associated with a common application user profile, and the first application shares the key with the second application by storing the key into a file associated with the common application user profile.

15. The system of claim 8, wherein the second application is associated with the key if the first and second applications are associated with a common user, and wherein the second application is not associated with the key if the first and second applications are not associated with a common user.

16. The system of claim 8, wherein the key is a universally unique identifier (UUID).

17. The system of claim 8, further comprising:
an operating system including the association module and the deduplication module, wherein the operating system generates a random number and sends the random number as the key to the first application.

18. The system of claim 17, wherein the first application receives the key from the operating system.

19. A machine-readable medium comprising a plurality of machine-readable instructions that when executed by one or more processors is adapted to cause the one or more processors to perform a method comprising:
receiving, by an operating system, a first key from a first application running on a computer system;
associating, by the operating system, the first key with a first memory allocated to the first application;
scanning a second memory for duplicate memory pages of the first memory, the second memory associated with a second key and allocated to a second application running on the computer system, wherein the scanning includes scanning a second memory page of the second memory; and
in response to a determination that the first and second keys are the same and that the scanned second memory page is a duplicate of a first memory page of the first memory, deduplicating the scanned second memory page and the first memory page.

20. The machine-readable medium of claim 19, wherein scanning the second memory includes in response to a determination that the first and second keys are the same, scanning the second memory.

* * * * *